United States Patent
Ziv et al.

(10) Patent No.: US 10,425,261 B2
(45) Date of Patent: Sep. 24, 2019

(54) TECHNIQUES FOR GENERATING MODULATED BACKSCATTERED SENSORY DATA

(71) Applicant: Wiliot, LTD., Caesarea (IL)

(72) Inventors: Dotan Ziv, Tel Aviv (IL); Yuval Domb, Raanana (IL)

(73) Assignee: Wiliot, LTD., Caesarea (IL)

( * ) Notice: Subject to any disclaimer, the term of this patent is extended or adjusted under 35 U.S.C. 154(b) by 0 days.

(21) Appl. No.: 15/976,289

(22) Filed: May 10, 2018

(65) Prior Publication Data

US 2018/0331865 A1 Nov. 15, 2018

Related U.S. Application Data

(60) Provisional application No. 62/506,235, filed on May 15, 2017.

(51) Int. Cl.
| | |
|---|---|
| *H04L 27/12* | (2006.01) |
| *H04L 27/00* | (2006.01) |
| *H04Q 9/00* | (2006.01) |

(52) U.S. Cl.
CPC .............. *H04L 27/12* (2013.01); *H04L 27/00* (2013.01); *H04Q 9/00* (2013.01); *H04Q 2209/43* (2013.01); *H04Q 2209/47* (2013.01); *H04Q 2209/88* (2013.01)

(58) Field of Classification Search
CPC ....... H04L 27/12; H04L 27/122; H04L 27/10; G06K 7/10158
USPC ................... 375/303, 305, 334; 340/120.34
See application file for complete search history.

(56) References Cited

U.S. PATENT DOCUMENTS

| | | |
|---|---|---|
| 2007/0001813 A1 | 1/2007 | Maguire et al. |
| 2011/0148591 A1 | 6/2011 | Reynolds et al. |
| 2013/0234536 A1 | 9/2013 | Chemishkian et al. |
| 2013/0265140 A1 | 10/2013 | Gudan et al. |
| 2014/0062664 A1 | 3/2014 | Gudan et al. |
| 2014/0062668 A1 | 3/2014 | Gudan et al. |
| 2014/0062671 A1 | 3/2014 | Gudan et al. |
| 2014/0062672 A1 | 3/2014 | Gudan et al. |
| 2014/0064028 A1* | 3/2014 | Coates .................... E21B 47/01 367/35 |
| 2014/0085051 A1 | 3/2014 | Gudan et al. |
| 2015/0091706 A1 | 4/2015 | Chemishkian et al. |
| 2015/0310715 A1 | 10/2015 | Nekoogar et al. |

(Continued)

OTHER PUBLICATIONS

Ensworth, et al., "Every Smart Phone is a Backscatter Reader: Modulated Backscatter Compatibility with Bluetooth 4.0 Low Energy (BLE) Devices", 2015 IEEE International Conference on RFID (RFID), Seattle, WA, pp. 78-85.

*Primary Examiner* — Khai Tran
(74) *Attorney, Agent, or Firm* — M&B IP Analysts, LLC (57) ABSTRACT

Certain embodiments disclosed herein include a circuit for generating modulated backscattered sensory data. The circuit includes a sensor configured to produce sensory data in a format of a bitstream; a waveformer configured to generate a waveform signal (m(t)) compliant with a wireless protocol; a backscatter mixer configured to modulate each bit in the bitstream using the waveform signal; and a wakeup trigger configured to trigger the backscatter mixer in response to a reception of a packet from a first wireless device, wherein the modulated backscattered bitstream is being transmitted to a second wireless device.

25 Claims, 5 Drawing Sheets

(56) References Cited

U.S. PATENT DOCUMENTS

| | | |
|---|---|---|
| 2015/0339499 A1 | 11/2015 | Nekoogar et al. |
| 2016/0196455 A1* | 7/2016 | Gudan .................. H04B 5/0062 340/10.5 |
| 2016/0365890 A1 | 12/2016 | Reynolds et al. |
| 2017/0126282 A1 | 5/2017 | Fromm et al. |

* cited by examiner

TECHNIQUES FOR GENERATING MODULATED BACKSCATTERED SENSORY DATA

CROSS-REFERENCE TO RELATED APPLICATIONS

This application claims the benefit of U.S. Provisional Application No. 62/506,235 filed on May 15, 2017, the contents of which are hereby incorporated by reference.

TECHNICAL FIELD

The present disclosure generally relates to wireless Internet of things (IoT) devices, and more particularly to backscattering packets using wireless IoT devices.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants, biochip transponders on farm animals, automobiles with built-in sensors, automation of lighting, heating, ventilation, air conditioning (HVAC) systems, and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, and low maintenance costs.

To this aim, an IoT device and wireless sensors are designed to support low power communication protocols, such as Bluetooth Low Energy (BLE), LoRa, and the like. To achieve low power consumption, at the physical layer, a wireless BLE-compliant device can be configured as a transmitter or a receiver. That is, a device can be implemented only a transmitter or a receiver. At the Link Layer, devices are divided into advertisers, scanners, slaves, and masters. An advertiser is a device that transmits packets; a scanner is a device that receives the advertiser's packets. A slave is connected to a master. Typically, advertisers and slaves have the lowest possible memory and processing burden, thus demonstrating low power (energy) consumption.

On the other hand, the scanners and masters perform most of the processing and, thus, are equipped with batteries, user interfaces, and possibly even an electricity supply. In an IoT network (i.e., a network of IoT devices), a typical design would be to shift most processing tasks from slaves to masters and from advertisers to scanners. Such a design would reduce the power consumption of the most resource-constrained devices and shift the burden to the most resource-intensive devices.

Modulated backscattering is a transmission technique utilized to reduce communication power consumption at the sensor node when compared to a conventional RF transmitter. Backscatter modulation allows a remote device to wirelessly telemeter information without operating a traditional transceiver. In conventional solutions, a backscatter device leverages a carrier transmitted by an external source (i.e., external to the backscatter modulator and the receiver). For example, an access point, a base station, or a dedicated transmitter can be used to transmit the carrier.

Conventional solutions for backscattering BLE packets operate based on the premise that the data can be transferred in broadcast "advertising packets" without requiring acknowledgements. Further, the three advertising channels defined in the BLE standard use a fixed modulation scheme in three fixed frequency channels centered on 2402 MHz, 2426 MHz, and 2480 MHz. Furthermore, every BLE receiver listens for incoming advertising packets across all three advertising channels and, thus, reception of advertising packets on any one channel is sufficient for the message to be received.

Figure 1:
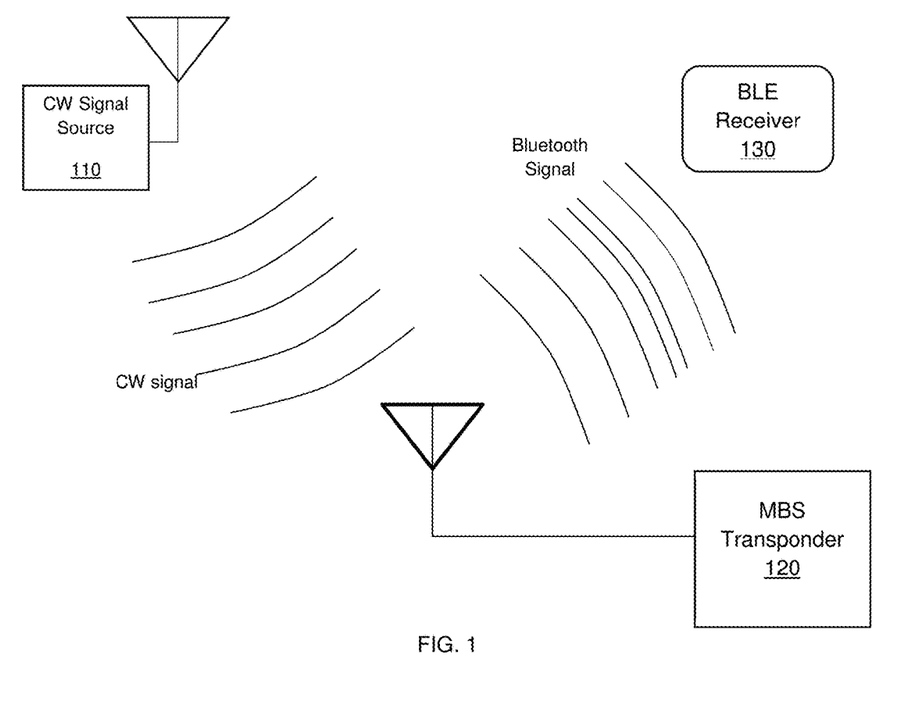
FIG. 1 a diagram utilized to describe the operation of a conventional solution for backscattering BLE packets.

As illustrated in FIG. 1, existing solutions for backscattering BLE packets require a continuous wave (CW) radio frequency (RF) source 110 to be present in the environment at a specially chosen frequency. A modulated backscattered (MBS) transponder 120 receives the CW signals and generates a backscattered spectrum including a band-pass signal in each of the BLE advertising channels in sequence. The band-pass signal is modulated using a binary frequency-shift keying (FSK) scheme at a predefined rate and formatted as BLE advertising packets. The BLE advertising packets are transmitted by the backscattered transponder 120 and received at a BLE receiver 130 (e.g., a smartphone). Typically, the backscattered transponder 120 includes a single field-effect transistor (FET, not shown) driven by a baseband source signal.

The disadvantage of the solution demonstrated above is that CW signals are generated by an additional external transmitter (an external source). Further, the modulation of the backscattered signals is performed using a CW signal having a frequency of 2.4 GHz, which is a congested frequency band due to, e.g., Wi-Fi signals.

Another backscatter technique utilized in Wi-Fi networks is based on piggybacking the backscattered signals on existing Wi-Fi transmissions using a non-standard protocol stack. Such a technique is very complicated to implement and requires hardware and software modifications to devices that receive and transmit backscatter signals.

It would therefore be advantageous to provide a solution for backscattering packets transmitted over wireless medium that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a circuit for generating modulated backscattered sensory data. The circuit includes a sensor configured to produce sensory data in a format of a bitstream; a waveformer configured to generate a waveform signal (m(t)) compliant with a wireless protocol; a backscatter mixer configured to modulate each bit in the bitstream using the waveform signal; and a wakeup trigger configured to trigger the backscatter mixer in response to a reception of a packet from a first wireless device, wherein the modulated backscattered bitstream is being transmitted to a second wireless device.

Certain embodiments disclosed herein also include a method for generating modulated backscattered sensory data. The method comprises producing, by a sensor, sensory data in a format a bitstream; generating a waveform signal (m(t)) compliant with a wireless protocol; modulating each bit in the bitstream using to the waveform signal; and triggering the modulation in response to a reception of a packet from a first wireless device, wherein a backscatter mixer outputs a modulated backscattered bitstream being transmitted to a second wireless device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
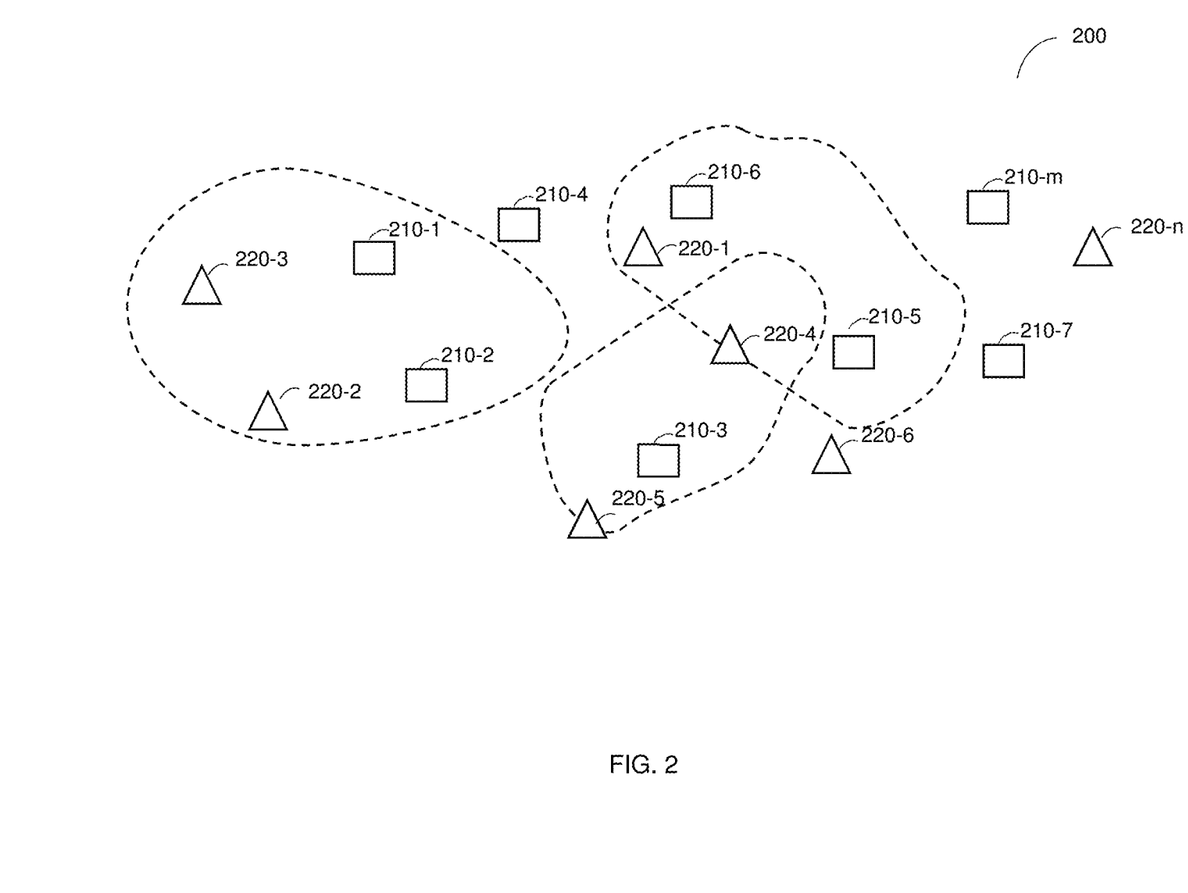
FIG. 2 is a diagram of a wireless environment utilized to describe the various disclosed embodiments.

FIG. 2 is an example diagram of a wireless environment 200 utilized to describe the various disclosed embodiments. The wireless environment 200 includes a plurality of wireless devices 210-1 through 210-m (hereinafter referred to individually as a wireless device 210 and collectively as wireless devices 210, merely for simplicity purposes) and a plurality of IoT chips 220-1 through 220-n (hereinafter referred to individually as an IoT chip 220 and collectively as IoT chips 220, merely for simplicity purposes).

The wireless devices 210 and IoT chips 220 can be connected in different coexisting wireless networks or be part of the same wireless network. Typically, a wireless network may include wireless elements (not shown), such as a wireless access point (AP), a wireless router, a switch, and the like. A wireless device 210 may be, but is not limited to, a laptop, a PC, a smartphone, a tablet computer, a wearable device, a peripheral device, an appliance, or any other electrical or electronic device that can communicate over a wireless medium.

An IoT chip 220 is designed to collect source data and transmit such data to one or more wireless devices 210 over a wireless medium. The IoT chip 220, designed according to the disclosed embodiments, transmits the sensor signals through backscatter modulation discussed in greater detail below. In an optional embodiment, an IoT chip 220 operates with no power supply (internal or external).

The wireless devices 210, and hence any wireless network operating in the environment 200, can facilitate communication using wireless protocols including, but not limited to, Bluetooth Low Energy (BLE), Bluetooth®, LoRa Wi-Fi®, Wi-Gi®, nRF, cellular communication protocols (e.g., LTE, 2G, 3G, 4G, etc.), DECT, Zigbee, Z-Wave, EnOcean, and the like.

According to the various disclosed embodiments, the source data is transmitted as a modulated backscatter packet or any packet transmitted by the wireless devices 210 in the vicinity of an IoT chip 220. That is, an IoT chip 220 is configured to backscatter any source data in packets transmitted over the air by one or more of the wireless devices 210. Without limiting the disclosed embodiments, the source data may be any data sourced from a sensor, a memory (not shown), a control packet, and so on.

Each packet transmitted by the devices 210 and remodulated and backscattered by the IoT chips 220 may be either have a predefined (known) pattern or an unknown pattern. Examples for packets having a predefined pattern include a BLE advertisement packet, a BLE scan packet, beacon frames (such as LoRa or BLE beacons), and the like. Examples for packets having an unknown pattern include BLE data packets, DECT user-data packets, and the like. It should be noted that the difference between known and unknown patterns in a packet is determined from the perspective of the IoT chip 220 performing the backscattering. That is, if the IoT chip 220 recognizes the pattern a-priori, the packet is considered to have a known pattern. Otherwise, the packet is considered to have unknown pattern.

The remodulation of backscattered packets (i.e., modulation of packets transmitted by the wireless devices 210 such that new modulated packets are constructed based on original packets that are available) can be performed by backscatter mixing of an original packet with a specially designed waveform. This procedure enables re-modulating any original modulation scheme to any other desired modulation scheme. Examples for such a modulation scheme, include, but are not limited to, FSK, QAM, and PSK. The remodulation scheme that is utilized is selected based on the intended recipient of the modulated backscattered packet.

For example, an IoT chip 220 is configured to re-modulate the original packet using a waveform that would transform the original packet into a BLE Gaussian frequency shift keying (GFSK) packet, when the receiving wireless device 210 of the packet is a BLE device. To this end, a wireless device 210 receiving the backscattered packet transmitted by the IoT chip 220 can demodulate the received packet to obtain the source data embedded in the backscattered packet. A receiving device 210 can process the sensory data, display the sensory data, or both.

For example, an IoT chip 220 may include a temperature sensor (not shown), and temperature readings can be periodically transmitted from the IoT chip 220 to a wireless device 210 in a re-modulated backscattered packet. The wireless device 210 can display the temperature reading. As another example, an IoT chip 220 may include an oxygen sensor, and oxygen level readings can be periodically transmitted from the IoT chip 220 to a wireless device 210 in a re-modulated backscattered packet. The readings can be processed by the receiving wireless device 210, and any oxygen level reading below a predefined value would trigger an alert. Other applications for utilizing the IoT chip 220 would be apparent to one of ordinary skill.

Figure 3:
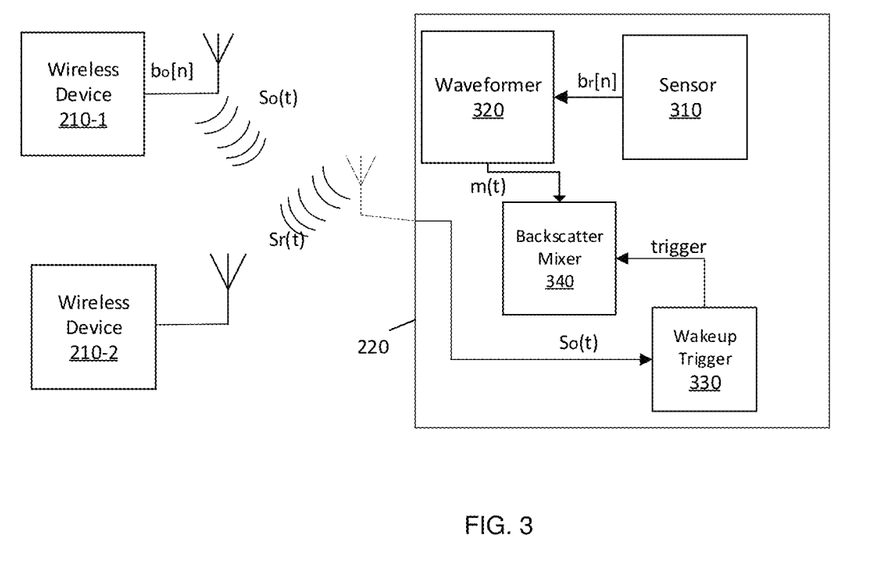
FIG. 3 a block diagram of an IoT chip structured to generate modulated backscatter packets according to an embodiment.

FIG. 3 shows an example block diagram of an IoT chip 220 designed according to an embodiment. The IoT chip 220 includes a sensor 310, a remodulation waveformer 320, a wakeup trigger 330, a backscatter mixer 340. The sensor 310 generates sensory (source) data (i.e., a bit stream) to be backscattered ($b_r[n]$). The sensor may be of various types including, but not limited to, temperature, humidity, weight, oxygen, $CO_2$, pressure, location, bio-feedback, water, acoustic, light, and so on. In some configurations, the IoT chip 220 may not include the sensor 310.

The remodulation waveformer 320 generates a waveform (m(t)) determined based on a wireless protocol that the IoT chip 220 is compliant with. In an example, for BLE compliance, the waveform m(t) is such that the resulting backscattered signal $s_r(t)$ is GFSK modulated.

The backscatter mixer 340 implements the remodulation function. In an embodiment, the backscatter mixer 340 is a RF field-effect transistor (FET) being toggled in response to the waveform signal m(t). The modulation of the sensor's 310 output data ($b_r[n]$) is triggered by the wakeup trigger 330. To this end, the wakeup trigger 330 is configured to synchronize with a received signal ($s_o(t)$) transmitted by a wireless device (210-1) acting as a packet source.

In one embodiment, the packet ($s_o(t)$) includes data having a predefined pattern. In this embodiment, the wakeup trigger 330 is configured to identity a bit pattern in the emitted packet ($s_o(t)$) that matches a predefined pattern. Upon identification of such a pattern, a trigger signal is generated and provided to the mixer 340 to initiate the remodulation. In some embodiments, the wakeup trigger 330 triggers upon pre-specified energy detection or another type signal synchronization technique.

In another embodiment, the packet ($s_o(t)$) includes data having an unknown pattern. In this embodiment, the wakeup trigger 330 is configured to detect an energy level over a predefined threshold level (defined by the respective protocol standard). Upon identification of such packet having an energy level above the threshold, a trigger signal is generated and provided to the mixer 340 to initiate the modulation. It should be noted that the IoT chip 220 and, hence, the modulator, can operate in either mode at a time (i.e., either synchronizing packets with known patterns or synchronizing packets with unknown patterns).

The operation of the IoT chip 220 will now be discussed in reference to a specific embodiment of backscattering BLE advertisement (ADV) packets. The wireless device 210-1 is the source of such packets and the wireless device 210-2 is the receiver of backscattered packets generated by the IoT chip 220. The wireless devices 210-1 and 210-2 may be any type of wireless device, such as those described above.

The current BLE protocol standard (version 4.0) supports 40 channels, each of which having spacing of 2 MHz. There are 3 advertising channels and 37 data channels. A broadcaster device (e.g., the device 210-1) may advertise on any one of the 3 advertisement channels. The modulation scheme defined for the BLE standard is a GFSK. To this end, within each channel, a frequency deviation greater than 185 KHz above the carrier frequency ($f_c$) corresponds to a bit with a binary value '1' and a frequency deviation less than −185 KHz corresponds to a bit with a binary value '0'.

Figure 4:
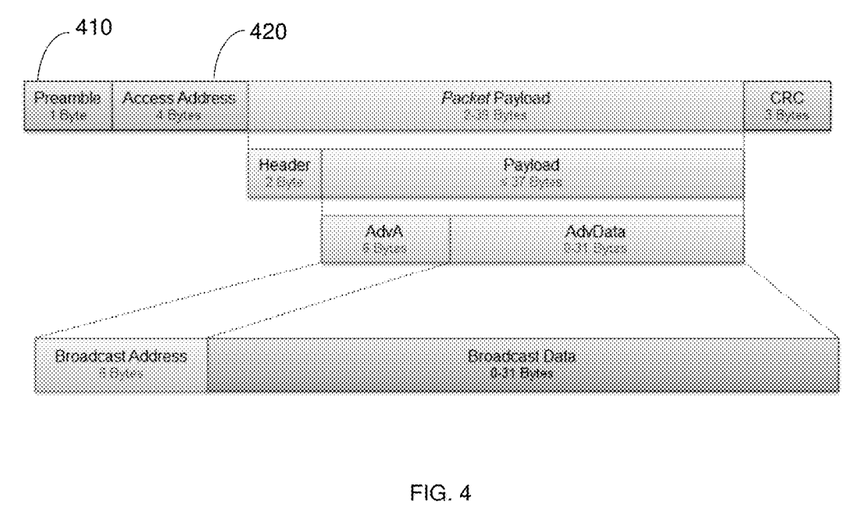
FIG. 4 illustrates a structure of a BLE advertisement packet.

The BLE advertisement packets are defined in the link layer. A structure of a BLE advertisement packet is shown in FIG. 4. A preamble field 410 and an access address field 420 have predefined patterns (values) of 10101010b and 0x8E89BED6, respectively.

The BLE ADV packets are "whitened" to avoid long sequences of '1' and '0', where the whitener and de-whitener are defined the same way, using a 7-bit linear feedback shift register with the polynomial $X_7+X_4+1$, the shift register is initialized with the channel index (37, 38, 39 in case of BLE ADV packets).

According to the disclosed embodiments, the wakeup trigger 330 attempts to synchronize with either of the patterns included in the preamble and access address fields to trigger the modulation. In another embodiment, the wakeup trigger 330 de-asserts any trigger signals when a sequence having a predefined length of '1' or '0' is identified in BLE ADV packets transmitted by the wireless device 210-1. In another embodiment, the wakeup trigger 330 triggers upon pre-specified energy detection.

The remodulation, once triggered, is performed at pre-defined time intervals. Specifically, for each bit, a re-modulated backscattered bit is generated based on the value of an emitted bit ($b_o[n]$) of a BLE ADV packet and a backscattered bit ($b_r[n]$) of the source data to be backscattered. In an example embodiment, the frequencies of the remodulation waveform m(t), forming a constant envelop GFSK modulated signal, are determined as follows:

TABLE 1

| $b_o[n]$ | $b_r[n]$ | m(t) |
|---|---|---|
| 0 | 0 | $f_m$ |
| 1 | 1 | $f_m$ |
| 0 | 1 | $f_m + 2\Delta_f$ |
| 1 | 0 | $f_m - 2\Delta_f$ |

It should be noted that the values of the bits ($b_o[n]$, $b_r[n]$) are known a-priori. The offset value $\Delta_f$ is the frequency deviation utilized to distinguish between '1' and '0'. For example, in a BLE protocol, the value of $\Delta_f$ can be set to 185 KHz. As noted above, $f_m$ is the center frequency offset, for example, the offset between the BLE advertisement channels. In an example embodiment, $f_m$ is set to 24 Mhz when the center frequency $f_0$ of the original signal is 2402 MHz resulting in $f_c$ of the re-modulated signal at 2426 MHz.

In an embodiment, the frequencies of a re-modulated waveform m(t) can be represented as the GFSK modulation of the differences between the backscattered bitstream and the emitted bitstream. That is, $$m(t) = \text{gfsk\_mod}(b_o[n] - b_r[n])$$

Figure 5:
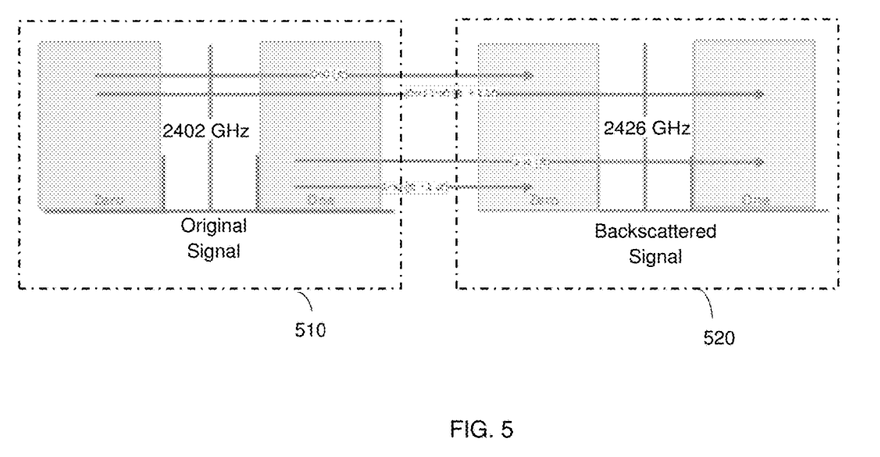
FIG. 5 is a diagram illustrating a modulated backscatter signal generated according to the disclosed embodiments.

An example schematic diagram illustrating an original signal 510 of the modulated emitted bit ($b_o[n]$) versus a re-modulated waveform (m(t)) 520 of the backscattered bit is shown in FIG. 5. The frequency $f_0$ is 2402 MHz.

Returning to FIG. 3, in another embodiment, the emitted packet is unknown. Accordingly, in an embodiment, an energy detection of a signal transmitted by the wireless device 210-1 would trigger the remodulation. The energy detection is performed by the wakeup trigger 330.

In this embodiment, the modulation is performed by shifting any detected signal by a higher frequency deviation that is allowed by the respective wireless standard. As an example, the modulation, once triggered, is performed for each detected signal, based on the value of a backscattered bit ($b_o[n]$), a frequency shift of a backscattered packet ($\Delta f_{sc2}$), a center frequency offset ($f_m$), and the frequency shift of the detected signal ($\Delta f_{original}$).

In an example embodiment, for BLE protocol, a remodulation waveform (m(t)) is generated as follows:

TABLE 2

| $\Delta f_{original}$ | $b_r[n]$ | $\Delta f_{sc2}$ | m(t) |
|---|---|---|---|
| 185 Khz | 0 | −450 Khz | $f_m$ − 265 Khz |
|  | 1 | 450 Khz | $f_m$ + 635 Khz |
| −185 Khz | 0 | −450 Khz | $f_m$ − 635 Khz |
|  | 1 | 450 Khz | $f_m$ + 265 Khz |
| 250 Khz | 0 | −450 Khz | $f_m$ − 200 Khz |
|  | 1 | 450 Khz | $f_m$ + 700 Khz |
| −250 Khz | 0 | −450 Khz | $f_m$ − 700 Khz |
|  | 1 | 450 Khz | $f_m$ + 200 Khz |

In this embodiment, the modulated backscattered signal m(t) can be represented as the GFSK modulation of $b_r[n]$ using $f_m +/- \Delta f_{sc2}$. In an example embodiment illustrated in Table 2, $f_m$ is set to 24 Mhz.

It should be noted that for the unknown pattern there is no strict synchronization or bit alignment requirement. That is, a specific bit in the resulting remodulation waveform m(t) may consist of two frequencies. Thus, the only requirement is that both of the resulting frequencies, included in the resulting GFSK representation of that bit, will be detected as value '1' by a wireless device 210-2.

Furthermore, according to some embodiments, non-linear techniques, such as usage of chirps or other non-stationary signals may be used in the construction of the remodulation waveform m(t), to achieve smoother representation of the resulting bits in the resulting backscattered signal $s_r(t)$. This is performed to aid a wireless device 210-1 in decoding the bit correctly.

It should be noted that although explicitly shown in FIG. 3, the IoT chip 220 includes a wireless transceiver connected to an antenna. The wireless transceiver may operate in the frequency spectrum compliant with the wireless protocol supported by the IoT chip 220. The form factor of the IoT chip may be a package-less circuit chip, a form factor of an RF ID, and the like. A chip is a piece of semiconducting material on which an integrated circuit or other circuitry is embedded.

It should be further noted that various embodiments described herein are discussed with respect to GFSK modulation in the BLE wireless protocol merely for simplicity purposes and without limitation on the disclosed embodiments. Other types of modulation schemes and wireless communication protocols, such as those described above may be equally adapted to backscatter signals as described herein without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A circuit for generating modulated backscattered sensory data, comprising:
    a sensor configured to produce sensory data in a format of a bitstream;
    a waveformer configured to generate a waveform signal (m(t)) compliant with a wireless protocol;
    a backscatter mixer configured to modulate each bit in the bitstream using the waveform signal; and
    a wakeup trigger configured to trigger the backscatter mixer in response to a reception of a packet from a first wireless device, wherein the modulated backscattered bitstream is being transmitted to a second wireless device, and wherein the wakeup trigger is further configured to trigger the backscatter mixer upon detection of an energy level exceeding a predefined threshold, wherein the received packet has an unknown pattern.

2. The circuit of claim 1, wherein the backscatter mixer is a radio frequency (RF) field-effect transistor (FET) being toggled in response to the waveform signal m(t).

3. The circuit of claim 1, wherein the waveform signal (m(t)) is generated in response to an emitted bit ($b_o[n]$) in the received packet.

4. The circuit of claim 3, wherein the waveform signal (m(t)) signal is a Gaussian frequency shift keying (GFSK) modulated signal.

5. The circuit of claim 4, wherein the wireless protocol is a Bluetooth Low Enemy (BLE) protocol, and wherein the waveform signal m(t) is set to any one of: a center frequency offset, and a center frequency offset with a predefined frequency deviation.

6. The circuit of claim 5, wherein the predefined frequency deviation distinguishes between a logic '1' value and a logic '0' value.

7. The circuit of claim 4, wherein the backscatter mixer is configured to shift the emitted bit ($b_o[n]$) in the received packet by a higher frequency deviation that is allowed by the wireless protocol.

8. The circuit of claim 1, wherein the wakeup trigger is configured to trigger the backscatter mixer upon detection of a known pattern in the received packet.

9. The circuit of claim 8, wherein the received packet is a BLE advertisement packet.

10. The circuit of claim 1, wherein the first wireless device is a source of the received packet and the second wireless device is a target recipient of the modulated backscattered bitstream.

11. The circuit of claim 10, wherein the first wireless device and the second wireless device are the same.

12. The circuit of claim 1, wherein the sensor is any one of: a temperature sensor, a humidity sensor, a weight sensor, an oxygen sensor, a $CO_2$ sensor, a pressure sensor, a location sensor, a bio-feedback sensor, a water sensor, an acoustic sensor, and a light sensor.

13. The circuit of claim 1, wherein the wireless protocol includes any one of: Bluetooth Low Energy (BLE), LoRa, and Digital Enhanced Cordless Telecommunications (DECT).

14. A method for generating modulated backscattered sensory data comprising:
  producing, by a sensor, sensory data in a format a bitstream;
  generating a waveform signal (m(t)) compliant with a wireless protocol;
  modulating each bit in the bitstream using to the waveform signal; and
  triggering, upon detection of an energy level over a predefined threshold, the modulation in response to a reception of a packet from a first wireless device, wherein a backscatter mixer outputs a modulated backscattered bitstream being transmitted to a second wireless device, and wherein the received packet has an unknown pattern.

15. The method of claim 14, further comprising:
  generating the waveform signal (m(t)) in response to an emitted bit ($b_o[n]$) in the received packet.

16. The method of claim 15, wherein the waveform signal m(t) signal is a Gaussian frequency shift keying (GFSK) modulated signal.

17. The method of claim 16, wherein the wireless protocol is a Bluetooth Low Energy (BLE) protocol, and wherein the waveform signal (m(t)) is set to any one of: a center frequency offset, and a center frequency offset with a predefined frequency deviation a center frequency offset and a predefined frequency deviation.

18. The method of claim 17, wherein the predefined frequency deviation distinguishes between a logic '1' value and a logic '0' value.

19. The method of claim 16, further comprising:
  shifting the emitted bit ($b_o[n]$) in the received packet by a higher frequency deviation that is allowed by the wireless protocol.

20. The method of claim 15, further comprising:
  triggering the backscatter mixer upon detection of a known pattern in the received packet.

21. The method of claim 20, wherein the received packet is a Bluetooth Low Energy (BLE) advertisement packet.

22. The method of claim 14, wherein the first wireless device is a source of the received packet and the second wireless device is a target recipient of the modulated backscattered bitstream.

23. The method of claim 22, wherein the first wireless device and the second wireless device are the same.

24. The method of claim 14, wherein the sensor is any one of: a temperature sensor, a humidity sensor, a weight sensor, an oxygen sensor, a $CO_2$ sensor, a pressure sensor, a location sensor, a bio-feedback sensor, a water sensor, an acoustic sensor, and a light sensor.

25. The method of claim 14, wherein the wireless protocol includes any one of: Bluetooth Low Energy (BLE), LoRa, and Digital Enhanced Cordless Telecommunications (DECT).

* * * * *